Nov. 28, 1933.   H. J. CRINER   1,937,332
BREAD SLICING MACHINE
Filed Aug. 29, 1932   3 Sheets-Sheet 3

Harry J. Criner   INVENTOR.

Patented Nov. 28, 1933

1,937,332

UNITED STATES PATENT OFFICE 1,937,332

BREAD SLICING MACHINE

Harry J. Criner, Davenport, Iowa, assignor of one-half to A. G. Bush, Davenport, Iowa Application August 29, 1932. Serial No. 630,756

12 Claims. (Cl. 146—88)

My invention relates to bread slicing machines of the continuous band-blade type.

The objects of my invention are:

1. To provide an endless band-blade bread slicing machine of superior efficiency utilizing each blade to make two slicing cuts;

2. To provide an endless band-blade slicing machine having improved means of maintaining the tension upon the blades and with means whereby the tension upon the entire set of blades may be adjusted and allowance made for variations in the length of the different individual blades;

3. To provide a bread slicing machine in which the slicing blades are so directed through the loaf as to assist the feeding action of the loaf through the sets of blades;

4. To provide adjustable feeding appliances for a bread slicing machine of the endless band type;

5. To provide adjustable retaining devices to avoid displacement of the bread while passing through the sets of cutting blades;

6. To provide a resilient pulley for endless band-blades for slicing machines;

7. To provide a machine of the endless band-blade type in which the blades may be readily removed from the pulleys.

I attain these objects by the means illustrated in the accompanying drawings, in which,—

Figures 1, 6:
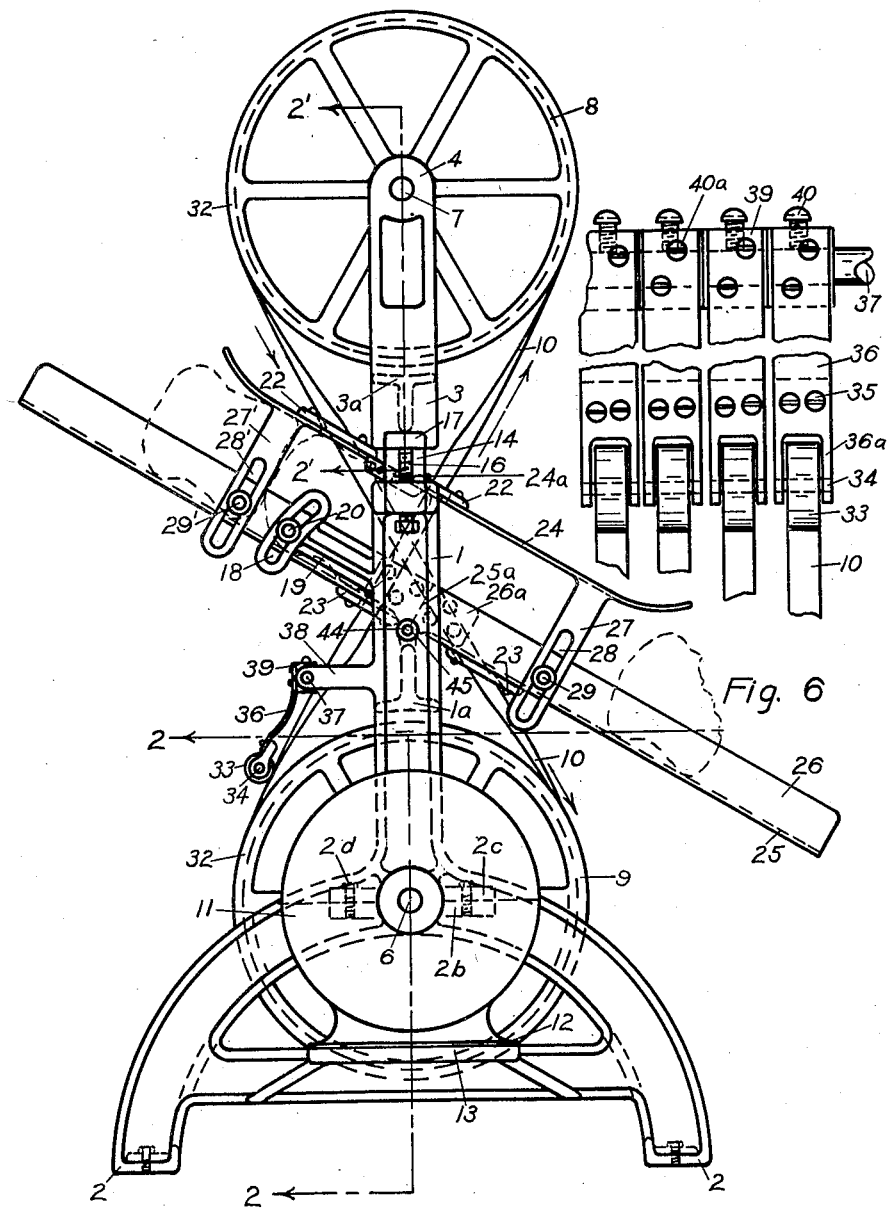
Figure 1 is a side elevation of my machine.
Figure 6 is an enlarged detail front view of a portion of the tension adjusters.

My invention comprises a fixed frame, 1, having feet, 2, formed integral therewith. The frame, 1, comprises a vertical post with diverging legs extending down to the feet, 2, and the feet, 2, extend horizontally at right angles to the post for practically the full width of the machine.

A lower arm, 1a, is cast integral with the frame, 1, and extends transversely of the machine at right angles to the frame, 1. The outer end of the arm, 1a, is curved downwardly forming a downward extension, 1b, parallel to the frame, 1.

The upper end of the frame, 1, is preferably rounded to form a column, 14. At the opposite side of the machine, I mount a corresponding column, 14a, which is cast integral with a block, 14b, supported as hereinafter described.

Movable frame members, 3 and 3b, united by a crossarm, 3a, have sleeves, 15, formed integral therewith and the sleeves, 15, are slidingly mounted upon the columns or shafts, 14 and 14a.

Lugs, 17, are formed integral with the sleeves, 15, and extend outwardly therefrom. An adjusting screw, 16, is threaded into a lug or boss formed integral with the frame, 1, and a corresponding adjusting screw, 16a, is threaded into the block, 14b. The upper ends of the adjusting screws, 16 and 16a, bear against the lugs, 17, and by turning the screws, 16 and 16a, the height of the sleeves, 15, upon the columns or shafts, 14 and 14a, may be adjusted as desired.

In order to afford additional support to the outer end of the arm, 3a, I interpose a section, 41, between the block, 14b, and the outer end of the lower arm, 1a, and this section may be secured in place by set screws, 42, or other suitable means.

In the upper end of the movable frame I provide bearings, 4, in which the upper shaft, 7, is mounted and in the frame, 1, and the lower end of the extension, 1b, I provide bearings, 5, in which the lower shaft, 6, is mounted. Upon the shafts, 6 and 7, I mount extended pulleys or drums, 9 and 8, respectively. These pulleys or drums may be either solid or hollow as desired, but upon the periphery thereof I form a plurality of channels or grooves, 32, in which I mount bands of rubber or other resilient material, 32a, having sufficient elasticity to permit a slight variation in the length of the various band blades hereafter described.

The pulleys, 8 and 9, are constructed with a relatively large diameter and are spaced a sufficient distance apart to permit the turning of the blades hereafter described. Upon the pulleys, 8 and 9, I mount a plurality of endless band-blades or slicing bands, 10, each of which passes around the upper pulley in one direction and around the lower pulley in the opposite direction, the intermediate portions of the blades being given a half turn so as to reverse their direction as described. These band-blades, 10, are preferably formed of a high grade, bandsaw steel and are preferably made approximately three-eighths of an inch in width and about fifteen-ten-thousandths of an inch in thickness, but the width and thickness may be varied as desired. The resilient bands, 32a, are preferably made a little wider than the cutting blades.

The bands and pulleys are preferably arranged to travel in the directions shown by the arrows shown in Figure 1. In order to assist in maintaining a practically uniform tension upon the band blades, I provide a pair of arms, 38, which are preferably formed integral with the frame, 1, and arm, 1a, with a crossbar, 37, rigidly mounted in the arms, 38. Upon the crossbar, 37, I mount a plurality of collars, 39, which may be secured in any desired position by set screws, 40. Upon each of the collars, 39, I mount a spring, 36, which is secured to the crossbars by set screws, 40a, or other suitable means. To the lower end of each spring, I unite a yoke, 36a, by rivets or screws, 35, and in each of the yokes an idler roll, 33, is mounted upon a shaft or pinion, 34.

The rolls, 33, bear against the respective band-blades, 10, and may be placed close to one of the pulleys, 9, as a very small travel of the rolls will be sufficient to take up any slack that is likely to exist.

It is obvious that with this arrangement of the blades, the portions of the blades at the points where they cross, will naturally be turned at right angles to the portions of the blades in contact with the pulleys, 8 and 9.

In order to support the bread while it is being sliced by the blades, I provide a feed table, 25, which is preferably made in two parts which separate on the line, 25a. The feed table, 25, is provided with flanges, 26, and the upper and lower portions of the feed table are secured in juxta-position by having the flanges, 26, bolted to brackets, 26a, by bolts, 26b. These brackets have an inwardly projecting sleeve, 43, formed integral therewith and these sleeves, 43, are mounted upon a shaft, 44, one end of which is secured in a suitable hub, 45, formed in the frame, 1, and the opposite end of which is secured in a similar hub, 45a, formed integral with the arm, 1a. The shaft, 44, forms a pivot upon which the brackets, 26a, and the feed table, 25, may rock and in order to lock the feed table in adjusted position, I form a T-shaped arm, 19, integral with the frame, 1, having a slot, 18, formed in the head of the arm, 19, with a stud bolt or set screw, 20, extending through the slot and secured to the adjacent flange, 26, of the feed table, 25. By tightening the set screw, 20, the table may be locked in any adjusted position within the limits of travel allowed by the slot, 18, and the proportions of the arm, 19, and the slot, 18, may be varied to meet the requirements of any particular case.

I prefer to mount the feed table at an angle of approximately 60° to the vertical frame and to mount the shafts, 6 and 7, in vertical alinement.

In order to secure the bread against displacement during the cutting operation, I provide an adjustable retainer plate, 24, which may be secured to the flanges, 26, by set screws, 29 and 29′, passing through slots, 28 and 28′, formed in arms, 27 and 27′, united to the retainer, 24, and extending downwardly therefrom.

The retainer, 24, is preferably constructed in two parts and is divided substantially into halves at a line, 24a, extending transversely of the retainer approximately at the middle thereof.

In order to permit the passage of the bands, 10, through the feed table, 25, I provide spaced longitudinal slots, 10a, which extend to the parting line, 25a, so as to permit the feed table to be readily removed, in order to take off or replace the cutting bands when necessary. I provide corresponding slots, 10b, in the retainer, 24, and the slots, 10b, likewise extend to the parting line, 24a, of the retainer, 24, so that by unbolting the bolts, 29 and 29′, the retainer may be readily removed without disturbing the bands.

In order to secure the retainer, 24, against displacement by reason of vibration, I form at each side of the adjoining ends of the two parts of the retainer, a downwardly extending flange, 24c, and these flanges may be held together by a side plate, 24d, united to the flanges by bolts, 24b.

In the construction of my machine, I prefer to form the pulleys with a diameter of four or five times the diameter of a loaf of bread and to space them apart a distance somewhat greater than the diameter of the pulleys. When so placed, it will require but slight pressure upon the portions of the bands intermediate the pulleys, to hold them in the proper line at their points of contact with the bread and to insure holding the blades in proper position, I provide guides, 22, which are attached to the upper face of the retainer by set screws or other suitable means, and guides, 23, which are similarly attached to the under face of the feed table.

These guides, 22, are preferably made of properly treated hard maple or other material adapted to form an oilless bearing. They are formed in the form of bars, 22, extending transversely of the feed table and retainer and have narrow slots, 10c, cut in them. The slots, 10c, are made of a width slightly exceeding the thickness of the blades, 10, so that the blades, 10, may travel freely therein and the slots, 10c, in the guides are alined with the slots, 10a, in the feed table and the slots, 10b, in the retainer. The slots, 10a and 10b, in the table and retainer are preferably made slightly wider than the slots, 10c, in the guides. When thus formed, the sides of the slots, 10c, will prevent the blades, 10, from coming in contact with the table, 25, or the retainer, 24. Various forms of guides may be used without departing from the spirit of my invention and roller guides may be provided if desired, but I prefer to use the oilless, stationary guides as they are more economical and much simpler to construct.

A motor, 11, with foot, 12, may be mounted upon a suitable support, 13, formed integral with the frame, 1. The motor, 11, may be directly connected to the shaft, 6, or may be geared or belted thereto as desired.

In the operation of my machine, the feed table is adjusted at the desired angle and the motor then started, turning in the direction to drive the bands, 10, in the direction shown by the arrows. The bread is then placed upon the upper end of the feed table, 25, to which it may be delivered either manually or by mechanical means as desired. The table, 25, is made smooth enough so that when placed at the angle shown in Figure 1, the bread will have a tendency to slide down the table, but the upper section of the feed table may be provided with any desired feeding appliance to carry the bread forward to the cutting blades.

As soon as the bread reaches the nearest portion of the cutting blades, (which will be traveling in a downward direction) the blades begin to cut at a corner of the loaf and as this portion of the blades is traveling downwardly and to the right, as shown in Figure 1, it is obvious that the friction of the blades upon the loaf will have a tendency to carry the loaf forward upon the feed table. This tendency will be effective enough, in most instances, to avoid the necessity of feeding means for pushing the loaf through the blades; particularly as the active upward moving portion of the blades is inclined slightly forward so as to prevent any backward movement of the bread being produced by the friction thereof. As shown in the drawings, the feed table is set at an angle of approximately 30° to the horizontal and the downward moving portions of the blades are at an angle of approximately 30° to the feed table, but I do not limit my invention to these precise angles.

It is obvious that the angles will vary with the size of the pulleys and the relative spacing apart of the pulleys as well as with the adjustment of the feed table, and the feeding action of the blades upon the loaves will vary with the relative angles of the feed table and the blades.

In a machine constructed as shown, it is not necessary to remove the pulleys in order to replace a broken or damaged band. The adjusting screws, 16 and 16a, may be loosened so as to relieve the tension upon the bands, the intermediate section 41, may then be unbolted and removed. The bread-board may be unbolted from the bracket and the connection between the two parts of the retainer taken off. The bread-board and retainer may then be withdrawn from the bands and the bands may be removed laterally from the drums, the crossed portion of the bands passing out through the space normally occupied by the intermediate section, 41, and the reverse of these operations will take place when the bands are replaced.

Normally the frame, 1, will be made heavy enough to carry the entire load of the pulleys, etc., but if desired to reduce the weight of this frame, a removable brace, 2a, corresponding to the lower part of the fame, may be added, the upper end, 2b, of which may be removably attached to the lower end, 2c, of the extension, 1b, by bolts, 2d, to form a support for the lower ends of the outer end of the arm, 1a. The lower ends of the brace, 2a, may be bolted to the feet, 2.

While I have shown the upper pulley shaft directly over the lower pulley shaft, it is obvious that this precise arrangement is not essential to the operation of my apparatus because the angle of the plane of the upper and lower shafts and the angle of the feed table and retainer to the vertical may be varied greatly without departing from the spirit of my invention.

When it is desired to use a horizontal feed table, the plane of the cutter shafts may be inclined at an angle of about 30° to the vertical which will maintain the downward traveling portion of the cutting blades at an angle of approximately 30° to the horizontal feed table or if it is desired to use a vertical feed table, the plane of the cutter shafts may be correspondingly inclined.

In order to avoid the necessity of cutting channels in the pulleys and fitting resilient bands therein, the channels and bands may be omitted and one or both of the pulleys may have a rubber or other resilient sleeve, 8a, mounted thereon which covers the entire face of the pulley. The blades, 10, may then be spaced upon the sleeve, 8a, or sleeves, and the resiliency of the rubber or other covering will allow for the variation in tension of the various bands.

Figure 2:
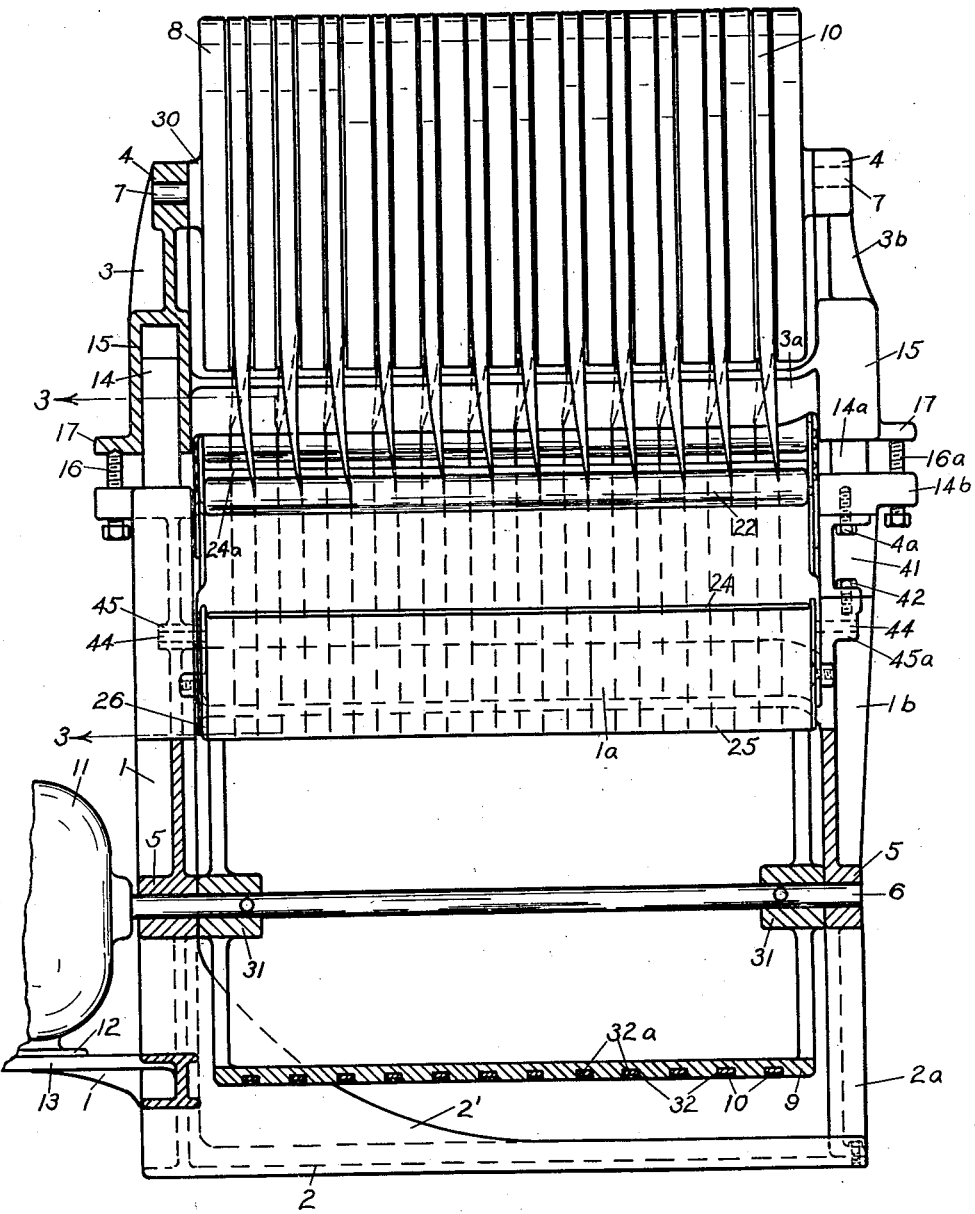
Figure 2 is an end elevation from the discharge end of the machine, but showing the lower portion of the machine in section on the line 2—2 of Figure 1 and the left side of the movable frame in section on the line 2'—2' of Figure 1.
Figure 4:
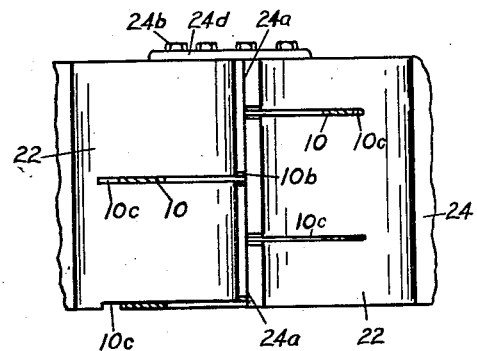
Figure 4 is an enlarged detail plan view of a portion of the broad retainer.
Figure 7:
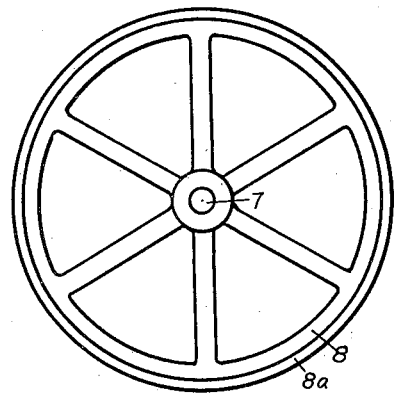
Figure 7 is an end view of an alternate form of pulley having a resilient facing.
Figure 3:
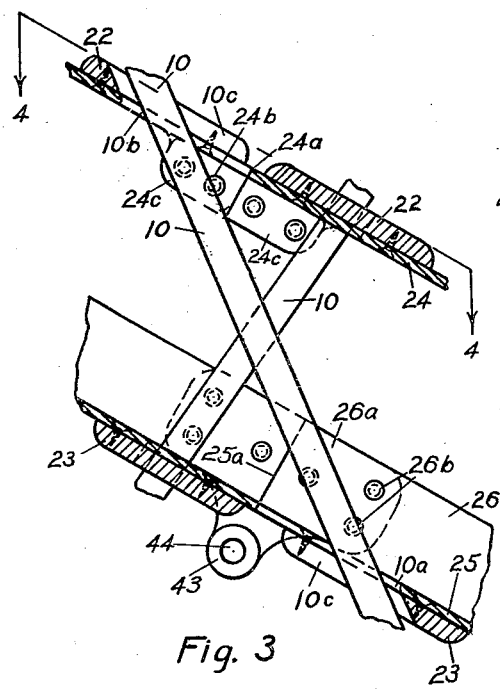
Figure 3 is an enlarged detail in section of a portion of the feed table and bread retainer.
Figure 5:
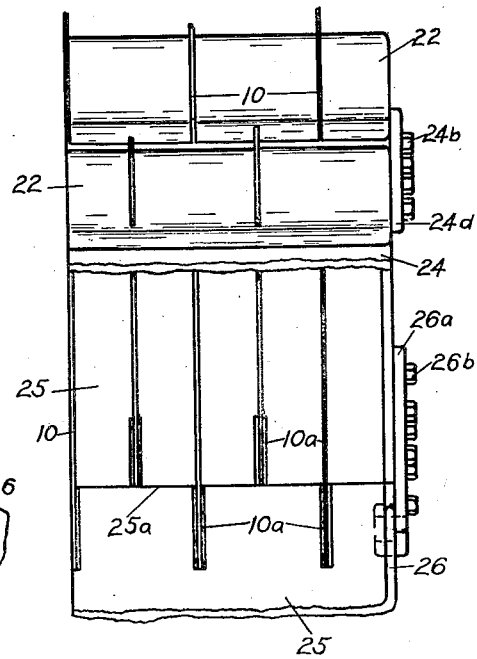
Figure 5 is an enlarged detail end view from the discharge end, of a portion of the feed table and of the retainer.

Figure 7 shows an end view of an alternate form of pulley, 8, having a resilient sleeve, 8a, mounted thereon in place of the bands, 32a, shown in Figure 2.

I claim:

1. A bread slicing machine comprising a stationary frame having a vertical side member with an extended base and a lower transverse arm with a downward extension united thereto, the upper end of the side member forming a fixed vertical shaft, an intermediate section removably united to the outer end of the arm, a removable upper member united to the intermediate member and carrying a second vertical shaft corresponding to the fixed vertical shaft, bearings formed in the side member and in the extension of the arm respectively, a brace removably united to the lower end of the arm extension and to the extended base, a transverse lower shaft mounted in the bearings, an adjustable frame slidingly mounted upon the fixed and second vertical shafts, a pair of upper bearings formed in the adjustable frame at opposite ends thereof, a transverse upper shaft mounted in the bearings, the upper and lower shafts being parallel and lying in the same vertical plane, multiple band pulleys mounted on the upper and lower shafts, and a plurality of spaced endless-band slicing blades mounted upon the pulleys, the blades being given a half turn in mounting them upon the pulleys whereby the blades will travel upon the respective pulleys in opposite directions, and will cross each other in the interval between the transverse arm and the movable frame.

2. A bread slicing machine comprising a stationary frame having a vertical side member with an extended base and a lower transverse arm with a downward extension united thereto, a movable brace united to the lower end of the downward extension and to the extended base, the upper end of the side member forming a fixed vertical shaft, an intermediate section removably united to the outer end of the arm, a removable upper member united to the intermediate member and carrying a second vertical shaft corresponding to the fixed vertical shaft, bearings formed in the side member and in the extension of the arm respectively, a transverse lower shaft mounted in the bearings, an adjustable frame slidingly mounted upon the fixed and second vertical shafts, a pair of upper bearings formed in the adjustable frame at opposite ends thereof, a transverse upper shaft mounted in the bearings, the upper and lower shafts being parallel and lying in the same vertical plane, multiple band pulleys mounted on the upper and lower shafts, and a plurality of spaced endless-band slicing blades mounted upon the pulleys, the blades being given a half turn in mounting them upon the pulleys whereby the blades will travel upon the respective pulleys in opposite directions, and will cross each other in the interval between the transverse arm and the movable frame.

3. A bread slicing machine comprising a stationary frame having a vertical side member with an extended base and a lower transverse arm with a downward extension united thereto, the upper end of the side member forming a fixed vertical shaft, an intermediate section removably united to the outer end of the arm, a removable upper member united to the intermediate member and carrying a second vertical shaft corresponding to the fixed vertical shaft, bearings formed in the side member and in the extension of the arm respectively, a transverse lower shaft mounted in the bearings, an adjustable frame slidingly mounted upon the fixed and second vertical shafts, a pair of upper bearings formed in the adjustable frame at opposite ends thereof, a transverse upper shaft mounted in the bearings, the upper and lower shafts being parallel and lying in the same vertical plane, parallel multiple band pulleys mounted on the upper and lower shafts, a plurality of spaced endless-band slicing blades mounted upon the pulleys, the blades being given a half turn in mounting them upon the pulleys whereby the blades will travel upon the respective pulleys in opposite directions, and will cross each other in the interval between the transverse arm and the movable frame, a feed table obliquely mounted in the brackets between and spaced from the band pulleys, and sloping downwardly from the intake end, a plurality of spaced longitudinal slots formed in the feed table in two series, one series to permit the passage of the blades descending and the other series for the passage of the blades ascending, the two slots accommodating any given blade being spaced laterally apart a distance equal to the desired thickness of the bread slices, said feed table being formed in upper and lower sections united to the brackets, said sections meeting approximately in the plane of the axes of the band pulleys and being so secured to the brackets as to be readily removable therefrom and the slots therein being extended to the adjacent ends of the respective sections.

4. In a bread slicing machine, a frame, parallel upper and lower shafts spaced apart in vertical alignment and revolvably mounted in the frame, a multiple band pulley mounted upon each shaft, a plurality of endless-band blades mounted in spaced relation upon the pulleys in figure 8 form, the pulleys being arranged to revolve in opposite directions, a feed table mounted in the frame between the pulleys at such an angle to the frame that the downwardly moving portions of the blades will contact with each oncoming loaf of bread before the upwardly traveling portions of the blades come in contact therewith, and separable on a division line parallel with and between the shafts, and spaced longitudinal slots in the feed table through which the blades move in their upward and downward travel.

5. In a bread slicing machine, a frame, parallel upper and lower shafts spaced apart in vertical alignment and revolvably mounted in the frame, a multiple band pulley mounted upon each shaft, a plurality of endless-band blades mounted in spaced relation upon the pulleys in figure 8 form, the pulleys being arranged to revolve in opposite directions, a feed table mounted in the frame between the pulleys at such an angle to the frame that the downwardly moving portions of the blades will contact with each oncoming loaf of bread substantially before the upwardly traveling portions of the blades come in contact therewith, and separable on a division line parallel with and between the shafts, and spaced longitudinal slots in the feed table through which the blades move in their upward and downward travel.

6. In a bread slicing machine, a frame, parallel upper and lower shafts spaced apart in vertical alignment and revolvably mounted in the frame, a multiple band pulley mounted upon each shaft, a plurality of endless-band blades mounted in spaced relation upon the pulleys in figure 8 form, the pulleys being arranged to revolve in opposite directions, a feed table mounted in the frame between the pulleys at such an angle to the frame that the downwardly moving portions of the blades will contact with each oncoming loaf of bread at a predetermined interval before the upwardly traveling portions of the blades come in contact therewith, and separable on a division line parallel with and between the shafts, and spaced longitudinal slots in the feed table through which the blades move in their upward and downward travel.

7. In a bread slicing machine, a frame, parallel upper and lower shafts spaced apart in vertical alignment and revolvably mounted in the frame, a multiple band pulley mounted upon each shaft, a plurality of endless-band blades mounted in spaced relation upon the pulleys in figure 8 form, the pulleys being arranged to revolve in opposite directions, a divided feed table adjustably secured in the frame between the pulleys sloping downwardly from the intake end and separable on a division line parallel with and between the shafts, longitudinal slots in the feed table permitting the travel of the blades through the table, said slots extending to the division line of the table, and an adjustable guide for the bread united to the feed table and arranged in two sections separable upon a line parallel with the division line of the feed table and having longitudinal slots corresponding to the slots in the feed table.

8. In a bread slicing machine, a frame, parallel upper and lower shafts spaced apart in vertical alignment and revolvably mounted in the frame, a multiple band pulley mounted upon each shaft, a plurality of endless-band blades mounted in spaced relation upon the pulleys in figure 8 form, the pulleys being arranged to revolve in opposite directions, a divided feed table adjustably secured in the frame between the pulleys sloping downwardly from the intake end and separable on a division line parallel with and between the shafts, longitudinal slots in the feed table permitting the travel of the blades through the table, said slots extending to the division line of the table, and a guide for the bread united to the feed table and arranged in two sections separable upon a line parallel with the division line of the feed table and having longitudinal slots corresponding to the slots in the feed table.

9. In a bread slicing machine, a frame, parallel upper and lower shafts spaced apart in vertical alignment and revolvably mounted in the frame, a multiple band pulley mounted upon each shaft, a plurality of endless-band blades mounted in spaced relation upon the pulleys in figure 8 form, the pulleys being arranged to revolve in opposite directions, a pair of brackets pivoted in the frame on opposite sides thereof, a feed table divided into two sections, both sections being removably united to the brackets on a division line of the sections lying parallel with and between the shafts, and longitudinal slots in both sections of the feed table extending to the division line thereof adapted to permit the travel of the blades through the table and facilitate the removal of the sections of the table from the machine when necessary to change a band.

10. In a bread slicing machine, a frame, parallel upper and lower shafts spaced apart in vertical alignment and revolvably mounted in the frame, a multiple band pulley mounted upon each shaft, a plurality of endless-band blades mounted in spaced relation upon the pulleys in figure 8 form, the pulleys being arranged to revolve in opposite directions, a pair of brackets pivoted in the frame on opposite sides thereof, a feed table divided into two sections, both sections being removably united to the brackets on a division line of the sections lying parallel with and between the shafts, longitudinal slots in both sections of the feed table extending to the division line thereof adapted to permit the travel of the blades through the table and facilitate the removal of the sections of the table from the machine when necessary to change a band, and means for locking the brackets in their various positions of angular adjustment relative to the frame.

11. In a bread slicing machine, a frame, parallel upper and lower shafts spaced apart in vertical alignment and revolvably mounted in the frame, a multiple band pulley mounted upon each shaft, a plurality of endless-band blades mounted in spaced relation upon the pulleys in figure 8 form, the pulleys being arranged to revolve in opposite directions, a pair of brackets pivoted in the frame on opposite sides thereof, a feed table divided into two sections, both sections being removably united to the brackets on a division line of the sections lying parallel with and between the shafts, longitudinal slots in both sections of the feed table extending to the division line thereof adapted to permit the travel of the blades through the table and facilitate the removal of the sections of the table from the machine when necessary to change a band, means for locking the brackets in their various positions of angular adjustment relative to the frame, and an adjustable guide for the bread united to the feed table and arranged in two sections separable upon a line parallel with the division line of the feed table and having longitudinal slots corresponding to the slots in the feed table.

12. In a bread slicing machine, a frame, parallel upper and lower shafts spaced apart in vertical alignment and revolvably mounted in the frame, a multiple band pulley mounted upon each shaft, a plurality of endless-band blades mounted in spaced relation upon the pulleys in figure 8 form, the pulleys being arranged to revolve in opposite directions, a pair of brackets pivoted in the frame on opposite sides thereof, a feed table divided into two sections, both sections being removably united to the brackets on a division line of the sections lying parallel with and between the shafts, longitudinal slots in both sections of the feed table extending to the division line thereof adapted to permit the travel of the blades through the table and facilitate the removal of the sections of the table from the machine when necessary to change a band, means for locking the brackets in their various positions of angular adjustment relative to the frame, an adjustable guide for the bread united to the feed table and arranged in two sections separable upon a line parallel with the division line of the feed table and having longitudinal slots corresponding to the slots in the feed table, and oilless bearing blocks united to the table and to the bread guide adjacent the slots adapted to form guides for the blades.

HARRY J. CRINER.